United States Patent
Okajima et al.

(10) Patent No.: US 9,873,089 B2
(45) Date of Patent: Jan. 23, 2018

(54) METHOD FOR LIFTING MEMBRANE SEPARATION APPARATUS

(71) Applicant: Kubota Corporation, Osaka (JP)

(72) Inventors: Yasunobu Okajima, Osaka (JP); Tadao Shinkai, Osaka (JP)

(73) Assignee: Kubota Corporation, Osaka (JP)

( * ) Notice: Subject to any disclaimer, the term of this patent is extended or adjusted under 35 U.S.C. 154(b) by 77 days.

(21) Appl. No.: 15/157,198

(22) Filed: May 17, 2016

(65) Prior Publication Data

US 2016/0256832 A1 Sep. 8, 2016

Related U.S. Application Data

(63) Continuation of application No. PCT/JP2014/079534, filed on Nov. 7, 2014.

(30) Foreign Application Priority Data

Nov. 26, 2013 (JP) .................................. 2013-243429

(51) Int. Cl.
*B01D 65/08* (2006.01)
*B01D 61/20* (2006.01)
(Continued)

(52) U.S. Cl.
CPC ............. *B01D 65/08* (2013.01); *B01D 61/14* (2013.01); *B01D 61/20* (2013.01); *C02F 3/1273* (2013.01);
(Continued)

(58) Field of Classification Search
CPC ............. B01D 2313/21; B01D 2313/56; B01D 2315/06; B01D 2321/18; B01D 61/14;
(Continued)

(56) References Cited

U.S. PATENT DOCUMENTS

2011/0049037 A1 3/2011 Masutani et al.

FOREIGN PATENT DOCUMENTS

| JP | 11-319511 A | 11/1999 |
| JP | 2001-255305 | 9/2001 |

(Continued)

OTHER PUBLICATIONS

English translation Japanese Patent Application No. 11-319511 (dated 1999).*

(Continued)

*Primary Examiner* — John Kim
(74) *Attorney, Agent, or Firm* — Beyer Law Group LLP

(57) ABSTRACT

A method for lifting a membrane separation device immersed in liquid to be treated so as to obtain permeated liquid passed through a filtration membrane provides a method for lifting the membrane separation device in a visible state without lowering the liquid level of a treatment tank. The method includes injecting a gas into a predetermined region of the membrane separation device, thereby raising the membrane separation device by a buoyancy generated by the injected gas through the liquid to be treated, and engaging an engaging portion of a lifting apparatus with an engageable portion provided to an upper portion of the membrane separation device, thereby lifting up the membrane separation device. The predetermined region may be a space constituting a flow path for the permeated liquid permeated through the filtration membrane.

13 Claims, 7 Drawing Sheets

(51) Int. Cl.
*B01D 61/14* (2006.01)
*C02F 3/12* (2006.01)
*B01D 63/08* (2006.01)
*B01D 61/18* (2006.01)

(52) U.S. Cl.
CPC .............. *B01D 61/18* (2013.01); *B01D 63/08* (2013.01); *B01D 2313/025* (2013.01); *B01D 2313/21* (2013.01); *B01D 2313/56* (2013.01); *B01D 2315/06* (2013.01); *B01D 2321/18* (2013.01); *C02F 2201/002* (2013.01); *Y02W 10/15* (2015.05)

(58) Field of Classification Search
CPC ........ B01D 61/18; B01D 63/08; B01D 65/08; C02F 2201/002; C02F 3/1273; Y02W 10/15
See application file for complete search history.

(56) References Cited

FOREIGN PATENT DOCUMENTS

| | | |
|---|---|---|
| JP | 2003-24752 | 1/2003 |
| JP | 2013-233484 | 11/2013 |
| WO | 2009/118785 | 7/2011 |

OTHER PUBLICATIONS

International Search Report dated Jan. 26, 2015 from PCT Application No. PCT/JP2014/079534.

* cited by examiner

METHOD FOR LIFTING MEMBRANE SEPARATION APPARATUS

This application is a Continuation of International Patent Application No. PCT/JP 2014/079534, filed on Nov. 7, 2014, which claims priority to Japanese Patent Application No. 2013-243429, filed on Nov. 26, 2013, each of which is hereby incorporated by reference.

BACKGROUND OF THE INVENTION

1. Field of the Invention

The present invention relates to a method for lifting a membrane separation device which is immersed in liquid to be treated so as to obtain permeated water through a filtration membrane.

2. Description of the Related Art

A water treatment device such as a membrane separation device disposed in a treatment tank is typically provided with a chain for lifting. A lifting apparatus is operated so as to lift up and down the membrane separation device after a hook of the lifting apparatus is engaged with a portion of the chain above the water.

Japanese Patent Laid-Open Application No. 2001-255305 discloses a lifting method using a lifting apparatus provided with a reference portion to be referenced when the lifting apparatus is positioned in a treatment tank, where the lifting apparatus includes a main body portion capable of moving up and down along with a water treatment device, a coupling portion capable of engaging with and disengaging from a hanging portion of the water treatment device, and a positioning portion for positioning the main body portion to the reference portion so as to align the coupling portion with the hanging portion of the water treatment device.

In accordance with the above-mentioned lifting apparatus, a membrane separation device can be accurately operated from outside of the treatment tank when the membrane separation device is immersed into the liquid to be treated and invisible from outside of the treatment tank.

However, in the above-mentioned lifting method, it is necessary for the lifting apparatus to be provided with a complicated mechanism in order to engage the hook or the like of the lifting apparatus with an engaging portion of the membrane separation device which is immersed in the liquid to be treated and thus invisible from outside of the treatment tank, which disadvantageously increases the initial cost and the maintenance cost of the lifting apparatus.

In addition, a conventional method of manually engaging the membrane separation device and the lifting apparatus requires highly complicated and cumbersome operations. It is also problematic that a separate liquid suction mechanism and a liquid storage mechanism are necessary to lower the liquid level of the treatment tank and expose the membrane separation device above the liquid surface.

Furthermore, since the chain and the like provided to the membrane separation device is also immersed into the liquid to be treated along with the main body, it may be corroded after a long-term use in the vicinity of an interface of the liquid surface such that the membrane separation device may not be properly lifted up using such a corroded chain.

BRIEF DESCRIPTION OF THE INVENTION

In view of the foregoing, an object of the present invention is to provide a method for lifting a membrane separation device in a visible state without lowering the liquid level of the treatment tank.

In order to achieve the above-mentioned object, a first characteristic construction of a method for lifting a membrane separation device in accordance with one embodiment of the present invention is that a method lifts the membrane separation device which is immersed in liquid to be treated so as to obtain permeated liquid through a filtration membrane, and that the method includes injecting a gas into a predetermined region of the membrane separation device; raising the membrane separation device by a buoyancy generated by the injected gas through the liquid to be treated; and engaging an engaging portion of the lifting apparatus with an engageable portion provided to an upper portion of the membrane separation device, thereby lifting the membrane separation device.

When the gas is injected into the predetermined region of the membrane separation device in a state in which the membrane separation device is immersed in the liquid to be treated, the membrane separation device is raised by the buoyancy generated by the gas injection, such that at least the upper portion of the membrane separation device becomes visible without lowering the liquid surface of the liquid to be treated. In such a visible state, it is very easy to engage the engaging portion of the lifting apparatus with the engageable portion provided to the upper portion of the membrane separation device.

A second characteristic construction of the lifting method in accordance with one embodiment of the present invention, in addition to the first characteristic construction described above, is that the predetermined region is a space forming a flow path for the permeated liquid having passed through the filtration membrane.

The space forming the flow path of the permeated liquid having passed through the filtration membrane is suitably utilized as the predetermined region into which the gas is injected.

A third characteristic construction of the lifting method in accordance with one embodiment of the present invention, in addition to the first or second characteristic construction described above, is that the membrane separation device includes a membrane module having a plurality of membrane elements each having the filtration membrane, and a liquid collection case coupled to each side of the plurality of membrane elements arranged in parallel to each other, that the liquid collection case includes a liquid collection space in communication with the flow path of the permeated liquid from each of the membrane elements, and that the predetermined region is the space forming the flow path of the permeated liquid in the membrane module.

In accordance with the above-described construction, a large space from the filtration membrane to the liquid collection space becomes available as a space for the gas injection, and thus the membrane separation device is easily raised although the membrane separation device may be relatively heavy.

A fourth characteristic construction of the lifting method in accordance with one embodiment of the present invention, in addition to the second characteristic construction described above, is that the membrane separation device includes a plurality of membrane elements each having a filtration membrane, that the membrane elements are of a flat membrane type in which the filtration membranes are outwardly expanded so as to increase the volume of the flow path of the permeated liquid by increasing the pressure inside the flow path, and that the injection of the gas to the predetermined region is absorbed by the expansion of the filtration membranes of the membrane elements.

Accordingly, although the space forming the flow path of the permeated liquid from the filtration membranes, which is the predetermined region, may be filled with the permeated liquid, adequate buoyancy is generated by injecting the gas and expanding the filtration membranes.

A fifth characteristic construction of the lifting method in accordance with one embodiment of the present invention, in addition to the second or third characteristic construction as discussed above, is that at least part of the permeated liquid remaining in the predetermined region is replaced with the gas by pressuring the gas into the predetermined region and draining the at least part of the permeated liquid remaining in the predetermined region into the liquid to be treated through the filtration membrane.

In accordance with the above described construction, the permeated liquid remaining in the predetermined region such as a space defined by the filtration membrane and the flow path of the permeated liquid is discharged from the membrane separation device through the filtration membrane by the pressure of the gas, whereby the space is replace by the gas.

A sixth characteristic construction of the lifting method in accordance with one embodiment of the present invention, in addition to the second or third characteristic construction described above, is that at least part of the permeated liquid remaining in the predetermined region is replaced by the gas, by sucking and discharging the at least part of the permeated liquid remaining in the predetermined region while exposing at least one portion of the predetermined region to the atmosphere.

In accordance with the above described construction, a negative pressure is generated in the predetermined region by sucking and discharging the permeated liquid remaining in the predetermined region, thereby making the gas (air) flow into the predetermined region through the portion thereof exposed to the atmosphere and replacing the space with the gas (air).

A seventh characteristic construction of the lifting method in accordance with one embodiment of the present invention, in addition to the second or third characteristic construction described above, is that at least part of the permeated liquid remaining in the predetermined region is replaced by the gas, by sucking and discharging the at least part of the permeated liquid while pressure-injecting the gas into the predetermined region.

In accordance with the above described construction, since the permeated liquid remaining in the predetermined region is sucked and discharged, and at the same time the gas is pressure-injected into the predetermined region, the space filled with the permeated liquid is quickly replaced by the gas, whereby the membrane separation device can be raised faster.

An eighth characteristic construction of the lifting method in accordance with one embodiment of the present invention, in addition to the first characteristic construction described above, is that the predetermined region is a dedicated region which is not in communication with the flow path of the permeated liquid having passed through the filtration membrane, and that the dedicated region expands when the gas is injected therein, and contracts when the gas is discharged therefrom.

The predetermined region is not limited to the flow path region of the permeated liquid, but the membrane separation device may be provided with a dedicated region dedicated to such gas injection. For example, a frame or side wall of the membrane separation device may be provided with a float region which expands when the gas is injected therein, and contracts when the gas is discharged therefrom.

A ninth characteristic construction of the lifting method in accordance with one embodiment of the present invention, in addition to any one of the first to eighth characteristic constructions described above, is that the membrane separation device is movable in an up-down direction along a guide member standing in the liquid to be treated, and is raised along the guide member by injecting the gas into the predetermined region.

In accordance with the above-described construction, since the membrane separation device rises along the guide member, the position of the membrane separation device does not become unstable while rising, and thus the membrane separation device keeps a stable position thereof when raised.

As described above, in accordance with the present invention, it has become possible to provide a method for lifting the membrane separation device in which the membrane separation device is lifted in a visible state without lowering the liquid level of the treatment tank.

DETAILED DESCRIPTION OF EMBODIMENTS OF THE INVENTION

Hereinafter, embodiments of the method for lifting the membrane separation device in accordance with the present invention are explained.

Figure 1A:
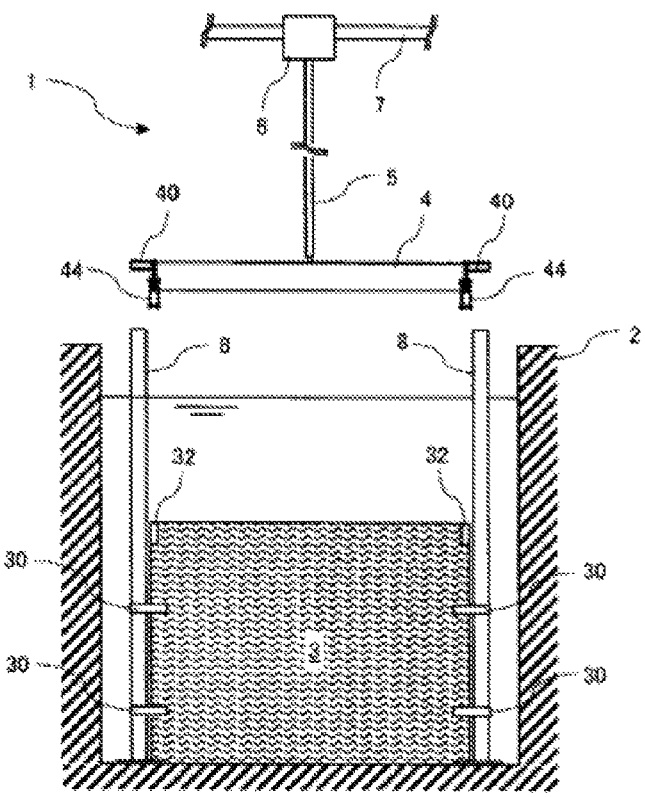
FIGS. 1A and 1B are diagrams explaining a method for lifting a membrane separation device in accordance with the present invention.
Figure 2:
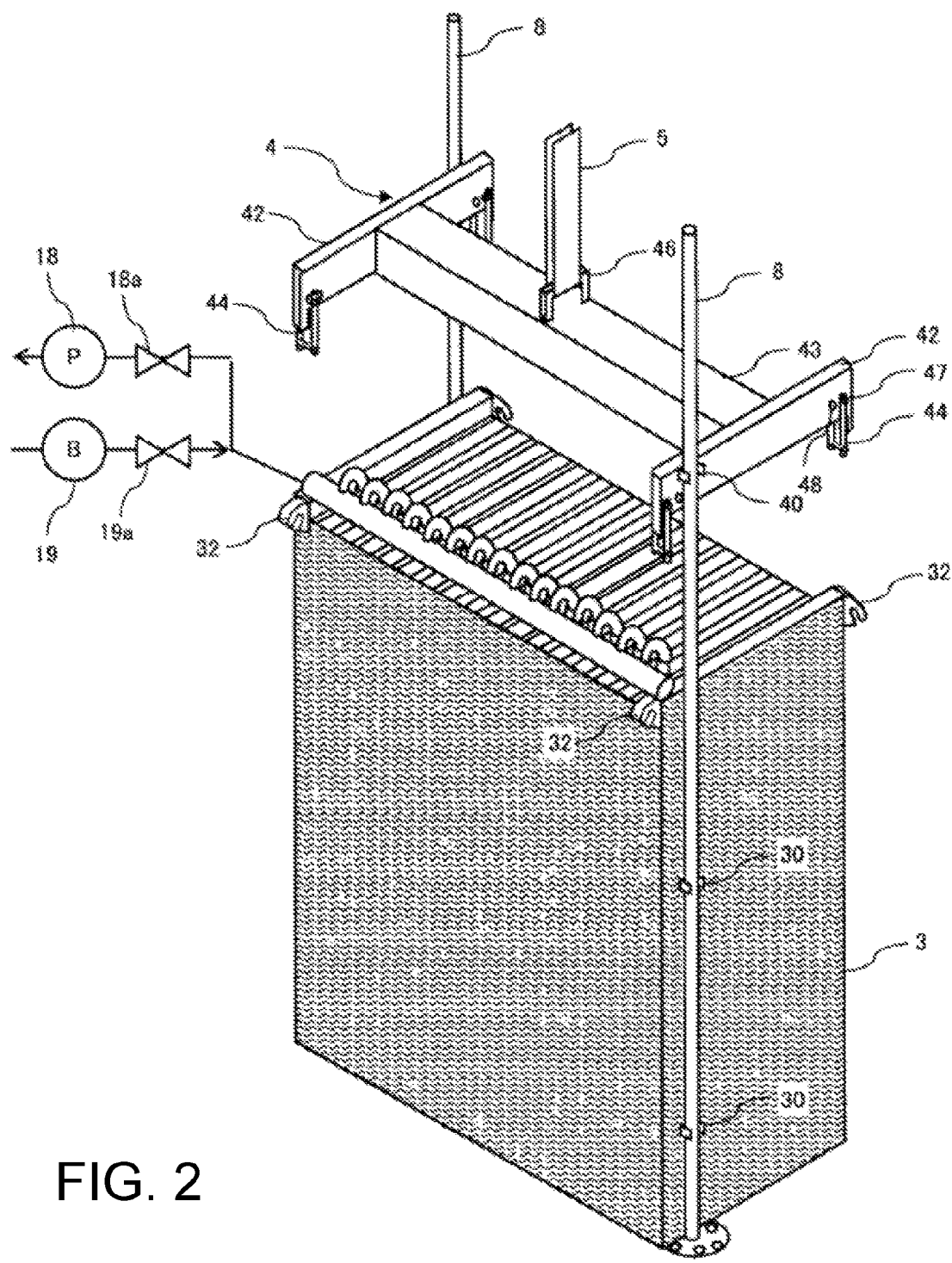
FIG. 2 is a diagram explaining the membrane separation device immersed in a treatment tank.

As shown in FIGS. 1A and 2, a water treatment facility 1 includes a treatment tank 2 which is a tank body, a membrane separation device 3 immersed in the water to be treated filled in the treatment tank 2, and a lifting apparatus 4 for lifting the membrane separation device 3.

The membrane separation device 3 is an immersion-type membrane separation device 3 having a membrane module in which a number of plate-shaped membrane elements are disposed in a casing having upper and lower openings such that respective membrane surfaces are vertically positioned and separated from one another by a predetermined distance provided therebetween, and a diffuser device disposed under the membrane module. The treatment tank 2 includes a plurality of membrane separation devices 3 immersed therein.

A lifting apparatus 4 is installed in order to lift and transport the membrane separation device 3 in and out of the treatment tank 2 when a periodic maintenance is conducted or a membrane element needs to be replaced.

A pair of guide bars 8 for positioning the membrane separation device 3 are provided on the bottom of the treatment tank 2 so as to stand upright. The membrane separation device 3 is immersed by engaging with the guide bars 8 by guided portions 30 provided on respective side walls of the membrane separation device 3. The pair of guide bars 8 are disposed in the vicinity of a pair of diagonal corners of the membrane separation device 3 in plan view. The guided portions 30 are provided on an upper portion of the side walls facing the respective guide bars 8. Each of the guided portions 30 has a pair of plate-shaped protrusions so as to hold the corresponding guide bar 8 therebetween.

The lifting apparatus 4 is hanging from a lifting equipment 6 such as a hoist crane via a cable body 5 such as a sling belt or chain so as to be freely raised and lowered. The lifting equipment 6 is supported by a rail 7 provided thereabove so as to be movable along the rail 7 in a horizontal direction.

Figure 3A:
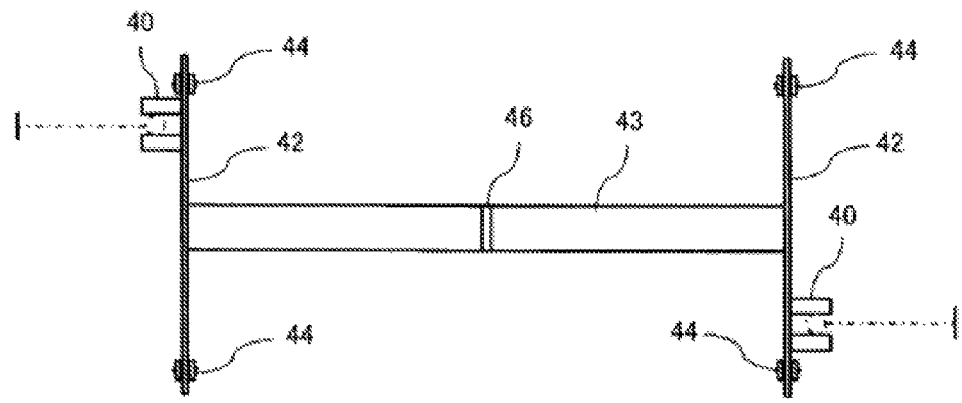
FIG. 3A is a plan view of a lifting apparatus.
Figure 3B:
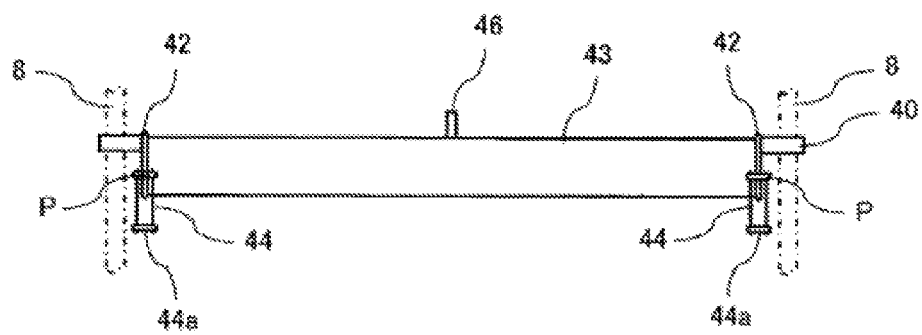
FIG. 3B is a front view thereof.
Figure 3C:
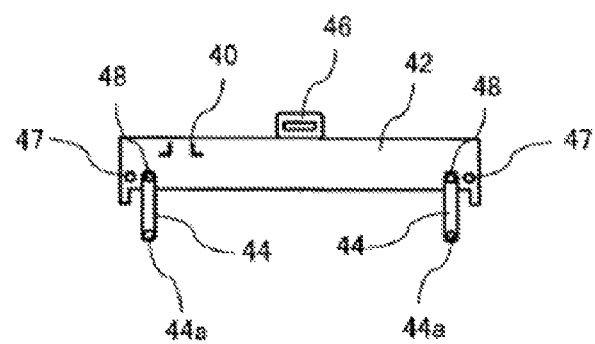
FIG. 3C is a side view thereof.

As shown in FIGS. 3A, 3B, and 3C, the lifting apparatus 4 includes a frame formed of a pair of side frames 42 made of steel plates, and a center frame 43 connecting the side frames 42. Each of the engaging portions 44 is attached vertically to the side frames 42 with a pivot pin P such that an upper portion thereof is rotatable.

Each of the engaging portions 44 has two elongated plate members lower portions of which are connected via an engaging pin which engages with an engageable portion 32 of the membrane separation device 3, while upper portions of which are rockably attached to the side frame 42 with the pivot pin P. The pivot pin P has a screw portion formed at an end thereof so as to be fastened by a nut.

More specifically, each of the side frames 42 has a pair of holes 47 and 48 on each side portion thereof, to which the engaging portion 44 can be attached, as shown in FIG. 3C. The engaging portion 44 is set to a first operation state for lifting up the membrane separation device 3 disposed in the treatment tank 2 when it is attached by inserting the pivot pin P into the inner-side hole 48. The engaging portion 44 is set to a second operation state for displacing the membrane separation device 3 which has been lifted up into the treatment tank 2 when it is attached by inserting the pivot pin P into the outer-side hole 47. In other words, the engaging portion 44 is configured such that the mounting state thereof is changeable between the first operation state and the second operation sate.

In addition, the center frame 43 has an attaching member 46 provided at a center portion thereof, to which the cable body 5 coupling to the lifting equipment 6 is attached. Each of the side frames 42 has a guided portion 40 provided on one side thereof, which engages with a corresponding one of the guide bars 8. The guided portion 40 also has a pair of plate-shaped protrusions so as to hold the guide bar 8 therebetween.

Figure 1B:
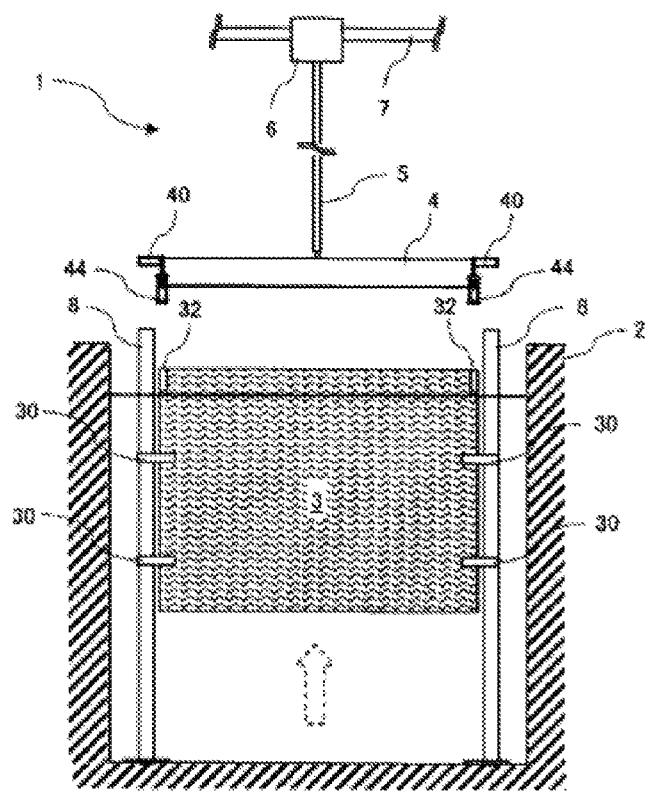

The method of lifting a membrane separation device is explained below in which the membrane separation device 3 immersed in the treatment tank 2 is taken out therefrom. As shown in FIG. 1B, the membrane separation device 3 is raised through liquid to be treated in the treatment tank 2 by a buoyancy generated in the predetermined region of the membrane separation device 3 by injecting gas (air in this embodiment) into the predetermined region.

Next, the lifting equipment 6 is extended so as to lower and position the lifting apparatus 4 in which each of the engaging portions 44 is set to the first operation state by attaching to the inner-side hole 48, such that the each of the guided portions 40 engages with the corresponding guide bars 8.

Figure 4A:
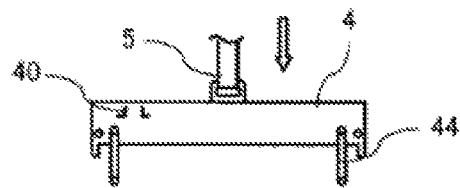
FIGS. 4A through 4D are diagrams explaining a lifting operation.
Figure 4B:
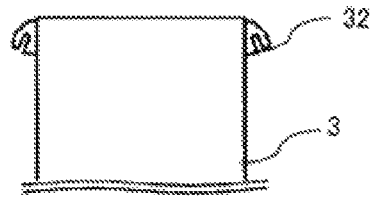

As shown in FIG. 4A, when the lifting apparatus 4 is lowered, each of the engaging portions 44 of the lifting apparatus 4 becomes in contact with the respective engageable portion 32 of the membrane separation device 3 from above, and as shown in FIG. 4B when the lifting apparatus 4 is further lowered, each of the engaging portions 44 rocks outwardly along a slope portion 32a of the corresponding engageable portion 32, that is, each of the engaging portions 44 pivots around the pivot pin P thereof.

Figure 4C:
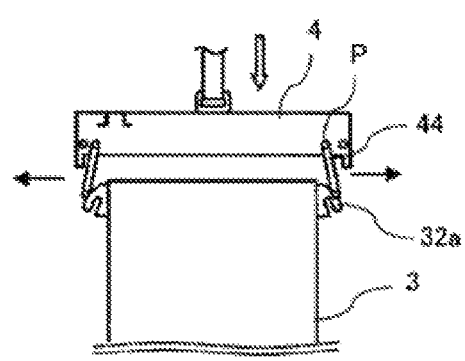

As shown in FIG. 4C, when the lifting apparatus 4 yet further goes downward, an engaging pin 44a passes the sloped portion 32a of the engageable portion 32 and pivots around the pivot pin P so as to return to its vertical position, whereby the engaging pin 44a and the engageable portion 32 engage with each other.

Figure 4D:
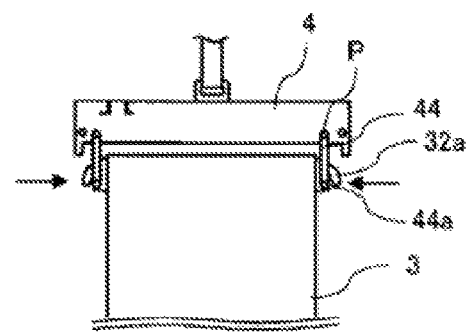

As shown in FIG. 4D, when the lifting equipment 6 is wound up so as to raise the lifting apparatus 4 in this engaged state, the membrane separation device 3 is lifted up from the treatment tank 2.

Figure 5A:
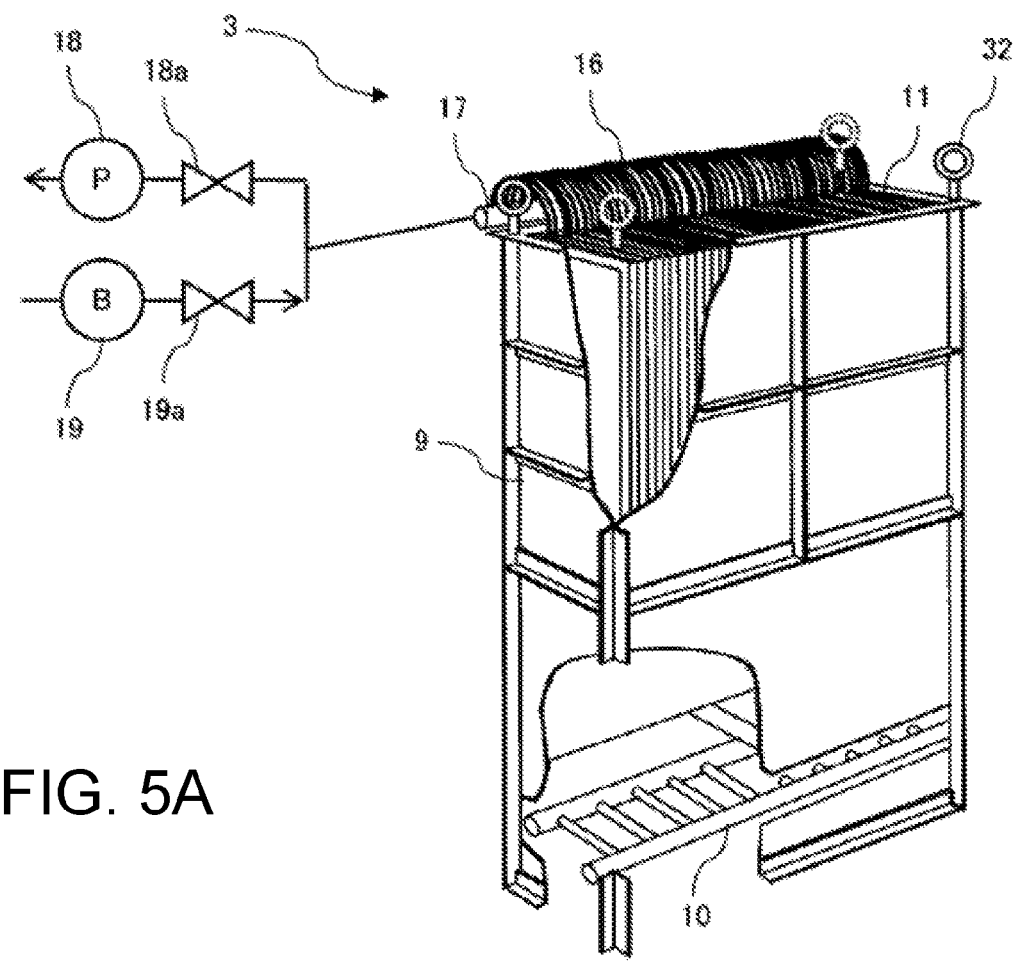
FIG. 5A is a diagram explaining an example of the membrane separation device.

The lifting apparatus 4 used in the lifting method of the membrane separation device 3 and the engageable portion 32 of the membrane separation device 3 are not limited to the examples described above, and may be configured in a suitable manner. For example, an eyebolt 32 and the like as shown in FIG. 5A may also be used as the engageable portion 32 of the membrane separation device 3, and a corresponding hook engaging with the eyebolt 32 may be provided to the lifting apparatus 4.

Figure 5B:
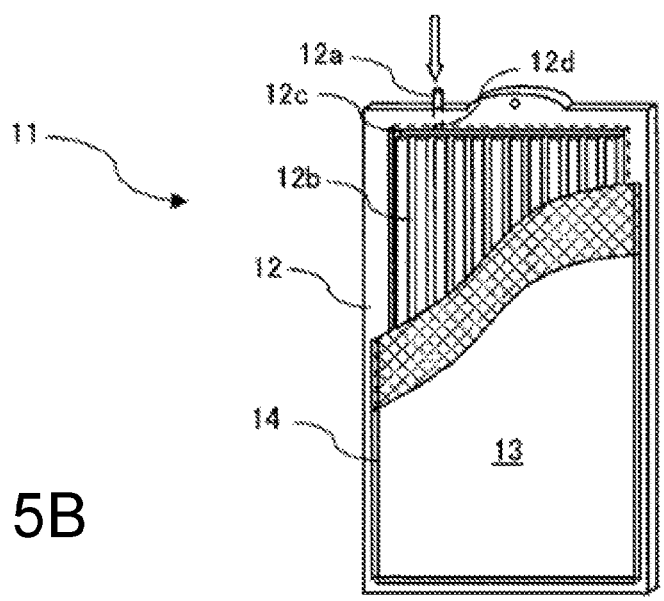
FIG. 5B is a diagram explaining a membrane element.

The predetermined region to which the gas is injected will be described below in detail. FIG. 5A shows an example of the membrane separation device 3, and FIG. 5B shows a membrane element 11 to be disposed in the membrane separation device 3. In this example, the membrane separation device 3 is provided with eyebolts 32 at the four upper corners thereof as the engageable portions 32.

The membrane separation devices 3 is provided with one hundred (100) plate-shaped membrane elements 11 disposed in a membrane case 9 having upper and lower open ends such that they are arranged in respective longitudinal positions and separated from each other with a fixed distance of about 6 mm to 10 mm (8 mm in this embodiment), and with a diffuser device 10 disposed under the membrane case 9.

The membrane elements 11 are connected via a liquid collection pipe 17 to a pump 18 as a pressure difference generation mechanism provided external to the tank, whereby the liquid to be treated in the tank is sucked and filtered through membranes of the membrane elements 11.

As shown in FIG. 5B, in each of the membrane elements 11 is of a flat membrane type, and a filtration membrane 13 is disposed on both of the front and rear faces of a filtration plate 12 made of a thermoplastic resin such as ABS resin having a height of 1000 mm and a width of 490 mm. Joining portions 14 provided at the periphery of the filtration membrane 13 are bonded to the filtration plate 12 by ultrasonic or thermal welding, or using adhesive.

The filtration membrane 13 is an organic filtering membrane in which a microporous membrane having an average pore diameter of about 0.2 µm is formed on a support body such as a nonwoven fabric made of PET, by coating and impregnating a porous resin thereon and therein.

A plurality of grooves 12b having a depth of about 2 mm and a width of about 2 mm are formed on a surface of the filtration plate 12 along a longitudinal direction thereof, and a horizontal groove 12c is formed at an upper end of the grooves 12b so as to communicate with each of the grooves 12b. The front and rear surfaces of the filtration plate 12 have respective horizontal grooves 12c which communicate with each other via a communication hole 12d which in turn communicates with a nozzle 12a formed at an upper edge portion of the filtration plate 12.

Each nozzle 12a is connected to the liquid collection pipe 17 via a respective tube 16, and the pump 18 is connected to the liquid collection pipe 17, such that the permeated liquid sucked by the pump 18 is transported to a treated liquid tank.

The predetermined region in the membrane separation device 3 having such a structure is a space defined by the filtration membrane 13 and a flow path for the permeated liquid formed by the grooves 12b and the horizontal grooves 12c.

In order to inject the gas into the predetermined region, a blower or compressor 19 and the pump 18 are both provided such that they are connectable to the liquid collection pipe 17. The pump 18 and the blower or compressor 19 are connected to the liquid collection pipe 17 via valves 18a and 19a, respectively.

When the membrane separation device 3 is raised, the gas is pressure-injecting into the predetermined region from the blower or compressor 19 through the liquid collection pipe 17 and the tubes 16 by closing the valve 18a and then opening the valve 19a. Due to the pressure of the gas, part of the permeated liquid inside the predetermined region is discharged into the liquid to be treated outside the membrane separation device 3 through the filtration membrane 13 and replaced by the gas, while the filtration membrane 13 expands outwardly, whereby buoyancy is generated in the predetermined region. It is also possible to generate the buoyancy using the expandable nature of the filtration membrane 13 by providing the gas so as to make it expand, without draining out the permeated liquid.

When the membrane separation device 3 is immersed, the valve 19 is closed and the blower 10 is stopped, while the pump 18 is operated with the valve 18a opened, whereby the gas was discharged from the predetermined region such that the buoyancy is lost.

Figure 6A:
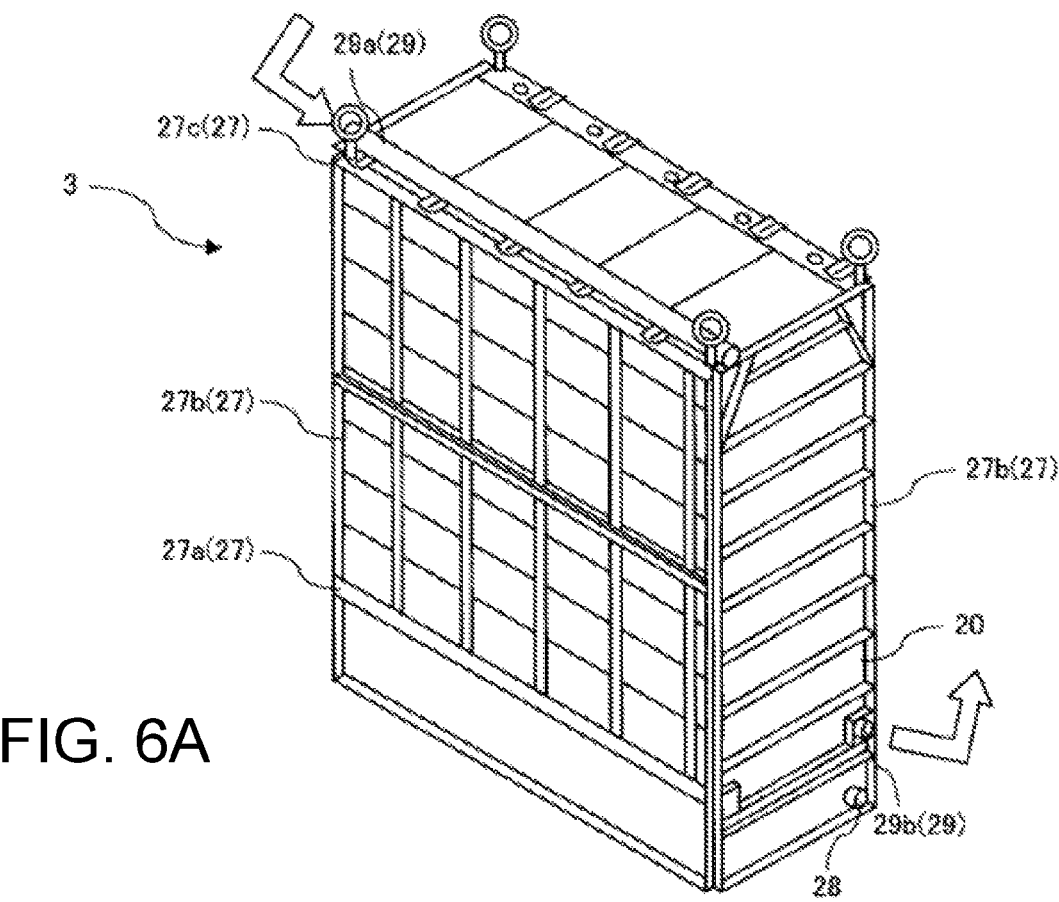
FIG. 6A is a diagram explaining another example of the membrane separation device.
Figure 6B:
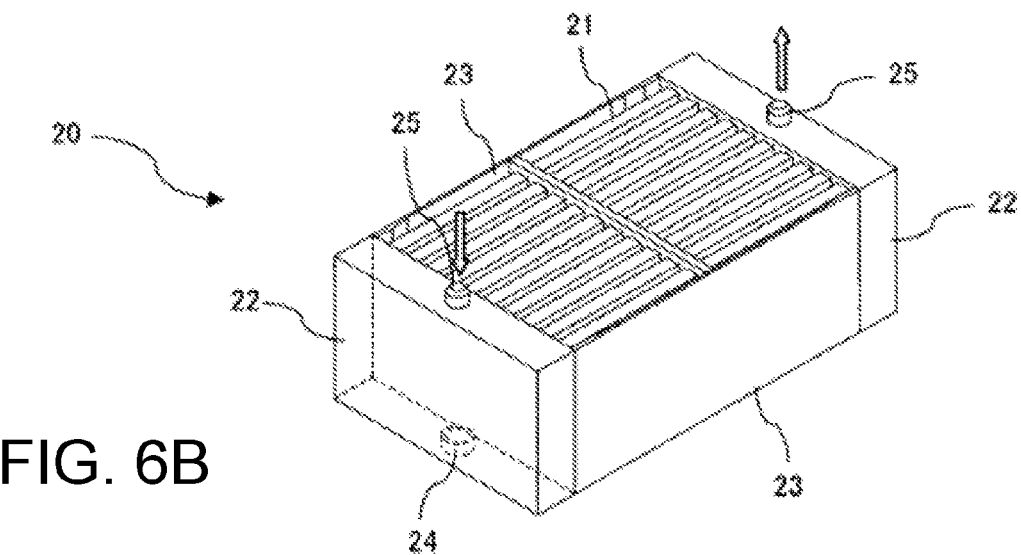
FIG. 6B is a diagram explaining a membrane module.

FIG. 6A shows another example of the membrane separation device 3 to which the lifting method according to the present invention is applied, and FIG. 6B shows a membrane module 20 installed in the membrane separation device 3.

The membrane separation device 3 includes five (5) membrane module groups each of which is formed by stacking the membrane modules 20 to have eight (8) stages in a longitudinal direction, where the membrane module groups are arranged in parallel in a horizontal direction and accommodated in a frame body 27.

The frame body 27 includes a lower frame 27a, a lateral frame 27b, and an upper frame 27c, etc. made of a metal in order to have a sufficient strength such that each of the membrane modules 20 is held in a stable position when they are immersed in a treatment tank, and the membrane modules 20 are accommodated therein so as to be disposed into or taken out from a biological treatment tank as a whole.

A diffuser air supply pipe 28 is provided under the membrane module 20 at the bottom of the stack in the biological treatment tank, and diffusion air supplied via the diffuser air supply pipe 28 causes an upward flow of the liquid to be treated between a plurality of membrane elements 21 which are in a longitudinal position and laterally arranged in a horizontal direction in each of the membrane modules 20. The treated liquid which has been filtered through the membrane surface of each membrane element 21 is led to the outside of the tank via a liquid collection pipe 29.

The liquid collection pipe 29 is in communication with a treated liquid delivery pipe (not shown in the drawings) which is provided outside the biological treatment tank and leads to the treated liquid tank, and a pumping apparatus is installed in a middle of the pipeline. The diffuser air supply pipe 28 is in communication with an air supply source such as a blower or a compressor.

Each of the membrane modules 20 includes a pair of front and rear liquid collection units 22, a pair of right and left cover members 23, and a plurality of membrane elements 21. The plurality of membrane elements 21 are disposed in a space defined by the pair of front and rear liquid collection units 22 and the pair of right and left cover members 23 and are arranged in a longitudinal position with a fixed distance therebetween such that membrane surfaces are facing one another.

Each of the membrane elements 21 is of a flat membrane type, and formed of a filtration plate in a form of a flat panel as a membrane support body, and a separation membrane, where the separation membrane is disposed on both sides of the filtration plate.

Each of the liquid collection units 22 is formed as a liquid collection case having a hollowed liquid collection space such that the treated liquid which has been filtered through the separation membrane is guided to the inside of the liquid collection unit 22 through liquid collection passages formed in the filtration plate.

The filtration plate is formed of ABS resin or polypropylene and the like, and the separation membrane is formed by coating and impregnating a porous resin into a non-woven fabric as a base material. The filtration plate is not limited to a rigid material such as ABS resin, but may be formed using a flexible material such as a sheet-shaped non-woven fabric or a net.

The liquid collection units 22 and the cover members 23 are obtained by injection molding of ABS resin, polypropylene, or the like. It is preferable that the liquid collection units 22 are made of a transparent or translucent material such that it may be easy to check if the sludge flows into the collection units 22 due to damages to the separation membrane and the like.

Each of the liquid collection units 22 has an opening 24 which is in communication with the respective liquid collection units 22 of the vertically adjacent membrane modules 20 such that the filtered liquid flows therethrough between the liquid collection units 22, and an insertion portion 25 which is engaged with an inner wall of the opening 24 and fitted therein in a liquid-tight state.

The insertion portion 25 is liquid-tightly fitted in the opening 24 formed in the liquid collection unit 22 of the membrane module 20 stacked immediately thereabove, thereby providing communication between the adjacent liquid collection units 22 in the vertical direction. Consequently, the membrane modules 20 stacked inside the frame body 27 are coupled to one another at respective opposing surfaces of the corresponding liquid collection units 22 adjacent in the vertical direction, and are stably held in their position via the coupling portions of the opening 24 and the insertion portion 25, while the permeated liquid which is collected from the membrane elements 21 of each of the membrane modules 20 into the collection unit 22 is allowed to flow through the liquid-tight coupling portions. The permeated liquid passing through the coupling portions is led out to the collection pipes 29 which are disposed in the vicinity of the upper frame 27c and the inside of the lower frame 27a.

In other words, the membrane separation device 3 includes the membrane modules 20 each having a plurality of membrane elements 21 provided with filtration membranes and arranged in parallel, and the liquid collection cases connected to the sides of the plurality of membrane elements 21 and provided with liquid collection spaces for collecting permeated liquid from the membrane elements 21.

The predetermined region is set as a space constituting a flow path of the permeated liquid in the membrane module 20.

One of the methods for raising the membrane separation device 3 having such a construction as described above is that of pressure-injecting gas into the predetermined region through the liquid collection pipes 29. Since at least part of the permeated liquid remaining inside the predetermined region is replaced with the gas by being discharged into the liquid to be treated outside the membrane separation device through the filtration membrane, the buoyancy is generated in the predetermined region. In addition, it is also possible to generate the buoyancy using the expandable nature of the filtration membranes 13 by supplying the gas into the membrane modules 20 so as to make the filtration membranes expand without draining out the permeated liquid.

Another method for raising the membrane separation device 3 is that of replacing at least part of the permeated liquid remaining in the predetermined region with the gas, by sucking and discharging the at least part of the permeated liquid via the liquid collection pipe 29b, while exposing at least one portion of the predetermined region, for example, the liquid collection pipe 29a, to the atmosphere.

A negative pressure is generated in the predetermined region by sucking and discharging the permeated liquid remaining in the predetermined region from the lower liquid collection pipe 29b among the liquid collection pipes 29 of the membrane separation device 3. At the same time, the gas (air) flows therein by exposing the upper liquid collection pipe 29a to the atmosphere. That is, a part of the predetermined region is replaced with the gas (air) so as to generate the buoyancy.

A yet another method for raising the membrane separation device 3 is that of replacing at least part of the permeated liquid remaining in the predetermined region with the gas, by sucking and discharging the at least part of the permeated liquid while pressure-injecting the gas into the predetermined region from at least one portion thereof.

A negative pressure is generated in the predetermined region by sucking and discharging the permeated liquid remaining in the predetermined region from the lower liquid collection pipe 29b provided in the lower frame 27a among the liquid collection pipes 29 of the membrane separation device 3. At the same time, the gas is pressure-injected through the liquid collection pipe 29a in the vicinity of the upper frame 27c, thereby the space filled with the permeated liquid is quickly replaced with the gas such that the membrane separation device 3 can be quickly raised up.

Although the predetermined region is the space constituting the flow path of the permeated liquid permeated through the filtration membrane in the above-mentioned embodiments, a dedicated region for the gas injection which is not in communication with the flow path of the permeated liquid in the membrane separation device 3 may be provided in order to raise the membrane separation device 3.

Figure 7A:
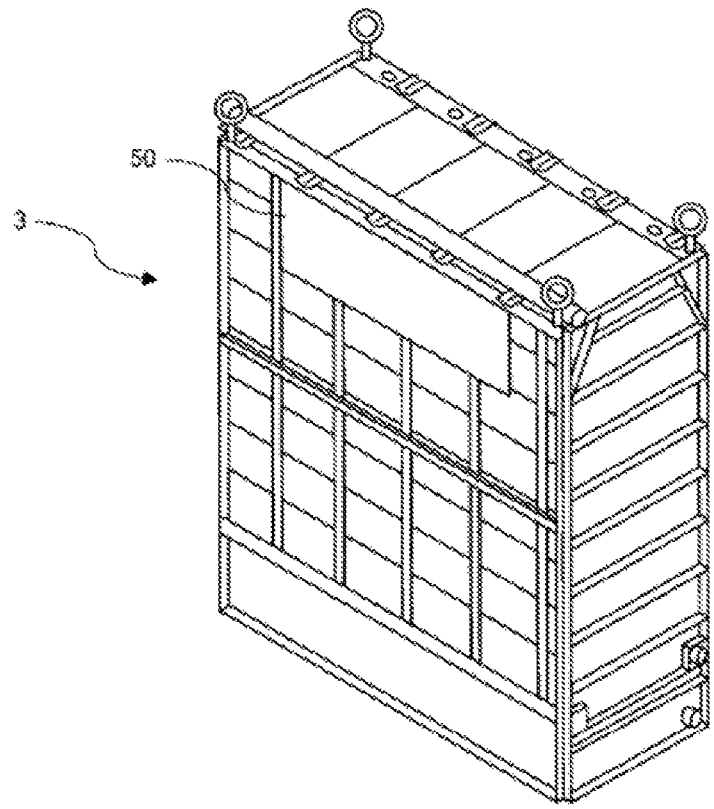
FIGS. 7A and 7B are diagrams explaining a dedicated region provided to the membrane separation device, into which gas for raising the membrane separation device is injected.
Figure 7B:
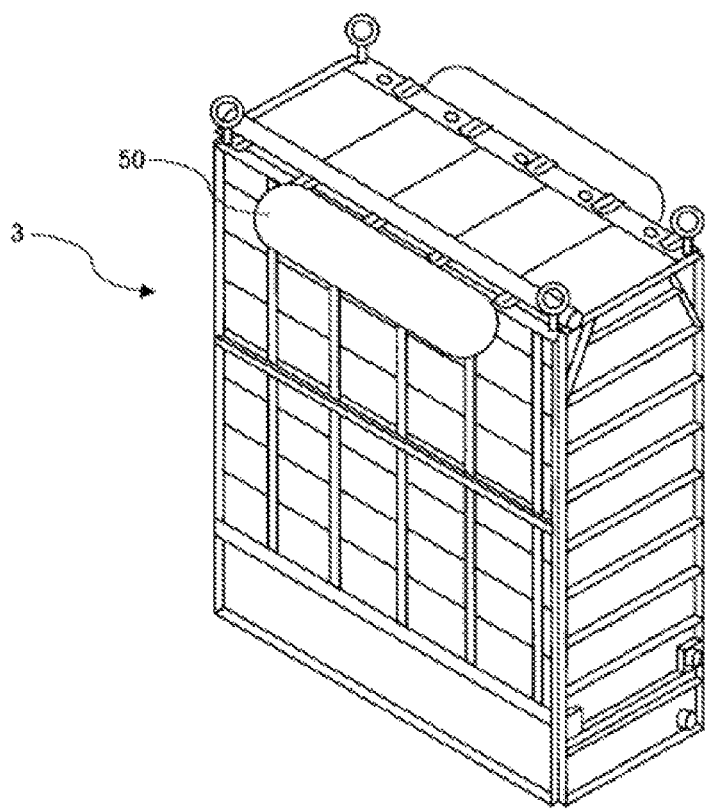

The membrane separation device 3 shown in FIGS. 7A and 7B is provided with a float 50 as a predetermined region which is dedicated to the gas injection. When the membrane separation device 3 is immersed into the liquid to be treated, the gas is discharged from the float 50 so as to deflate the float 50 as shown in FIG. 7A. On the other hand, when the membrane separation device 3 is to be raised through the liquid to be treated, the gas is injected to the float 50 such that buoyancy is generated by the inflated float 50, as shown in FIG. 7B. Such a float 50 can be provided to any type of membrane separation device 3.

In the embodiment shown in FIGS. 1 and 2, the membrane separation device 3 is raised along the pair of guide bars 8 which are disposed standing upright at the diagonal positions in the treatment tank 2 in plan view thereof. However, the guide bars 8 can be a single bar, or three (3) or more guide bars 8 may be provided. The guide bars 8 may be omitted in some embodiments. In addition, the positions of the guide bars 8 are not limited to the diagonal positions of the membrane separation device 3 in plan view.

Each embodiment mentioned above is an example of the present invention, and the present invention is not limited by the description. For example, the membrane element may be of a type other than the flat membrane type, such as a hollow fiber membrane or ceramic membrane type. A design of the specific structure of each part can be changed so long as the function and effect of the present invention can be achieved.

What is claimed is:

1. A method for lifting the membrane separation device immersed in liquid to be treated so as to obtain permeated liquid through a filtration membrane, the method comprising:
    injecting a gas into a predetermined region of the membrane separation device, thereby raising the membrane separation device by a buoyancy generated by the injected gas through the liquid to be treated; and
    engaging an engaging portion of a lifting apparatus with an engageable portion provided to an upper portion of the membrane separation device, thereby lifting the membrane separation device,
    wherein the predetermined region is a space forming a flow path for the permeated liquid having passed through the filtration membrane.

2. The method for lifting the membrane separation device in accordance with claim 1,
    wherein the membrane separation device includes a plurality of membrane elements each having a filtration membrane, the membrane elements being of a flat membrane type in which the filtration membranes are outwardly expanded so as to increase a volume of the flow path of the permeated liquid by increasing a pressure inside the flow path,
    and wherein the injection of the gas to the predetermined region is absorbed by the expansion of the filtration membranes of the membrane elements.

3. The method for lifting the membrane separation device in accordance with claim 1, further comprising:
    replacing at least part of the permeated liquid remaining in the predetermined region with the gas, by pressuring the gas into the predetermined region and draining the at least part of the permeated liquid remaining in the predetermined region into the liquid to be treated through the filtration membrane.

4. The method for lifting the membrane separation device in accordance with claim 1, further comprising:
    replacing at least part of the permeated liquid remaining in the predetermined region with the gas, by sucking and discharging the at least part of the permeated liquid remaining in the predetermined region while exposing at least one portion of the predetermined region to the atmosphere.

5. The method for lifting the membrane separation device in accordance with claim 1, further comprising:
replacing at least part of the permeated liquid remaining in the predetermined region with the gas, by sucking and discharging the at least part of the permeated liquid remaining in the predetermined region while pressure-injecting the gas into the predetermined region.

6. The method for lifting the membrane separation device in accordance with claim 1, wherein the predetermined region is a dedicated region which is not in communication with the flow path of the permeated liquid permeated through the filtration membrane, the dedicated region expanding when the gas is injected therein, and contracting when the gas is discharged therefrom.

7. The method for lifting the membrane separation device in accordance with claim 1, wherein the membrane separation device is movable in an up-down direction along a guide member standing in the liquid to be treated, the membrane separation device being raised along the guide member by injecting the gas into the predetermined region.

8. The method for lifting the membrane separation device in accordance with claim 1, wherein the membrane separation device comprises a membrane module, the membrane module including:
a plurality of membrane elements each having the filtration membrane; and
a liquid collection case coupled to each side of the plurality of membrane elements arranged in parallel to each other, the liquid collection case including a liquid collection space in communication with the flow path of the permeated liquid of each of the membrane elements,
and wherein the predetermined region is the space forming the flow path of the permeated liquid in the membrane module.

9. A method for lifting the membrane separation device immersed in liquid to be treated so as to obtain permeated liquid through a filtration membrane, the method comprising:
injecting a gas into a predetermined region of the membrane separation device, thereby raising the membrane separation device by a buoyancy generated by the injected gas through the liquid to be treated; and
engaging an engaging portion of a lifting apparatus with an engageable portion provided to an upper portion of the membrane separation device, thereby lifting the membrane separation device,
wherein the membrane separation device comprises a membrane module, the membrane module including:
a plurality of membrane elements each having the filtration membrane; and
a liquid collection case coupled to each side of the plurality of membrane elements arranged in parallel to each other, the liquid collection case including a liquid collection space in communication with the flow path of the permeated liquid of each of the membrane elements,
and wherein the predetermined region is the space forming the flow path of the permeated liquid in the membrane module.

10. The method for lifting the membrane separation device in accordance with claim 9, further comprising:
replacing at least part of the permeated liquid remaining in the predetermined region with the gas, by pressuring the gas into the predetermined region and draining the at least part of the permeated liquid remaining in the predetermined region into the liquid to be treated through the filtration membrane.

11. The method for lifting the membrane separation device in accordance with claim 9, further comprising:
replacing at least part of the permeated liquid remaining in the predetermined region with the gas, by sucking and discharging the at least part of the permeated liquid remaining in the predetermined region while exposing at least one portion of the predetermined region to the atmosphere.

12. The method for lifting the membrane separation device in accordance with claim 9, further comprising:
replacing at least part of the permeated liquid remaining in the predetermined region with the gas, by sucking and discharging the at least part of the permeated liquid remaining in the predetermined region while pressure-injecting the gas into the predetermined region.

13. The method for lifting the membrane separation device in accordance with claim 9, wherein the membrane separation device is movable in an up-down direction along a guide member standing in the liquid to be treated, the membrane separation device being raised along the guide member by injecting the gas into the predetermined region.

* * * * *